United States Patent [19]

Turner

[11] Patent Number: 5,372,488

[45] Date of Patent: Dec. 13, 1994

[54] OIL WELL PUMP WITH RADIALLY EXPANDABLE INTERLOCKING SEAL RING

[76] Inventor: Richard L. Turner, Rte. 2, Box 138, Broken Arrow, Okla. 74014-9802

[21] Appl. No.: 116,365

[22] Filed: Sep. 3, 1993

[51] Int. Cl.⁵ .................... F04B 21/00; F01B 31/00
[52] U.S. Cl. .................... 417/554; 417/555.2; 417/569; 92/185; 92/257; 277/221
[58] Field of Search ............ 92/185, 247, 255, 257; 417/555.2, 557, 554, 555.1, 552, 569; 277/220, 221, 222

[56] References Cited

U.S. PATENT DOCUMENTS

| 29,621 | 8/1860 | Robinson et al. | 92/257 |
|---|---|---|---|
| 255,522 | 3/1882 | Lewis | 417/554 |
| 1,390,577 | 9/1921 | Nagy | 277/221 |
| 1,956,868 | 5/1934 | Lemmon | 417/554 |
| 2,221,775 | 11/1940 | Boynton | 417/555.2 |
| 2,392,182 | 1/1946 | Payne | 92/185 |
| 2,591,230 | 4/1952 | Bertrand | 92/257 |
| 2,674,956 | 4/1954 | Hilton | 417/555.2 |
| 4,395,204 | 7/1983 | Turner | 417/554 |
| 4,762,476 | 8/1988 | Turner | 417/554 |
| 4,983,105 | 1/1991 | Mims, Sr. | 417/554 |

FOREIGN PATENT DOCUMENTS

| 899197 | 5/1945 | France | 277/222 |
|---|---|---|---|
| 207706 | 7/1958 | Sweden | 277/222 |
| 10353 | of 1908 | United Kingdom | 277/221 |

Primary Examiner—Richard A. Bertsch
Assistant Examiner—Roland G. McAndrews, Jr.
Attorney, Agent, or Firm—Head & Johnson

[57] ABSTRACT

Improvements in a downhole submerged pump assembly having a plunger formed of a cast or machined cylindrical member includes seal ring grooves capable of receiving flat metallic seal rings formed of a plurality of segments which are interlocked in a manner wherein the segments can expand during the upstroke of the pump movement and retract during the downstroke.

15 Claims, 3 Drawing Sheets

OIL WELL PUMP WITH RADIALLY EXPANDABLE INTERLOCKING SEAL RING

CROSS REFERENCE TO RELATED ART

This application is an improvement of my prior U.S. Pat. No. 4,229,149, issued Oct. 21, 1980; U.S. Pat. No. 4,395,204, issued Jul. 26, 1983; and U.S. Pat. No. 4,762,476, issued Aug. 9, 1988.

BACKGROUND OF THE INVENTION

This invention relates to improvements in oil well pumps and more particularly, but not by way of limitation, to a reciprocating subsurface oil well pump.

A typical submerged oil well plunger type pump of the displacement type consists of a plunger and travelling check valve that is reciprocatingly received within a stationary working barrel formed as a part of the oil well production tubing. The working barrel itself is provided with a standing valve and is submerged usually in well fluid.

In one embodiment, the pump is normally secured to the lowermost end of a sucker rod string, which extends longitudinally through production tubing situated in the well bore. A reciprocating device at the surface is usually a 'horsehead' type which alternately raises and lowers the string of sucker rods in the well bore. Subsurface pumps have long presented problems in the lifting of the well fluid to the surface of the ground in that the plunger of the pump is usually several feet long and thus requires a relatively long stroke for operation of the pump. This results in substantially great friction and drag on the pump as the pump plunger reciprocates within the working barrel. As a result, the pump plunger may not move freely nor provide a full stroke, thus reducing the pumping efficiency. In addition, since most of the subsurface pumps are relatively long, it may require several strokes of the pump before a sufficient load is applied to the pump to start the pumping action. Also, many well fluids contain sand and other foreign particles which hinder the operation of the subsurface pump and frequently damage the working parts thereof.

Newer forms of pump systems utilize a reciprocating wire line mechanism. A wire line winch provided at the surface will replace the horsehead type apparatus. Such a system includes control means for rotating the winch in one direction for the upstroke and controllably releasing the winch in the reverse direction for the downstroke. In such a system a weighted oil well plunger type pump must be capable, during the upstroke, of providing adequate ring seals for producing the fluid, while on the downstroke, the seal rings must be capable of permitting substantial release of the plunger so that it will fall to its bottom dead center position for the repeat of the process.

Pump plungers of the prior art have been provided with the various means for affecting the necessary fluid seal between the plunger and the working barrel. Such devices are shown in the aforesaid patents cited above. See also U.S. Pat. No. 3,953,155. In many of the prior art plunger pumps, the seal means between the plunger and the working barrel are apt to lose their close tolerance fit because of wear and, therefore, must be pulled occasionally to replace the parts. The pulling operation causes down-time on the well and expense in making the necessary repairs.

SUMMARY OF THE INVENTION

It is an object of this invention to provide a travelling plunger for a down hole submerged pump assembly with means by which the exterior of the plunger is sealed to the interior of the working barrel wherein the seal is metal and yet capable of being expanded by means of fluid pressure affected from within the plunger and the production tubing, yet capable of retracting to allow the plunger to controllably fall to its bottom dead center position for repeat of the reciprocating motion.

Specifically, the invention resides in a plunger which is provided with a substantially hollow cylindrical portion, in which a plurality of seal ring grooves are provided having a plurality of openings which communicate from the interior of the plunger to the seal ring groove. A plurality of metal seal rings are provided for each groove, each ring composed of a plurality of interlocking yet expandable and retractable elements. A threaded means is provided at the bottom of the plunger includes a removable valve seat wherein additional plungers may be threadably attached in series to form a plurality of plunger assemblies.

These and various other objects and advantages of the invention will become readily apparent to those skilled in the art upon reading the detailed description and claims along with reference to accompanying drawings.

DETAILED DESCRIPTION OF THE PREFERRED EMBODIMENT

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

Figure 1:
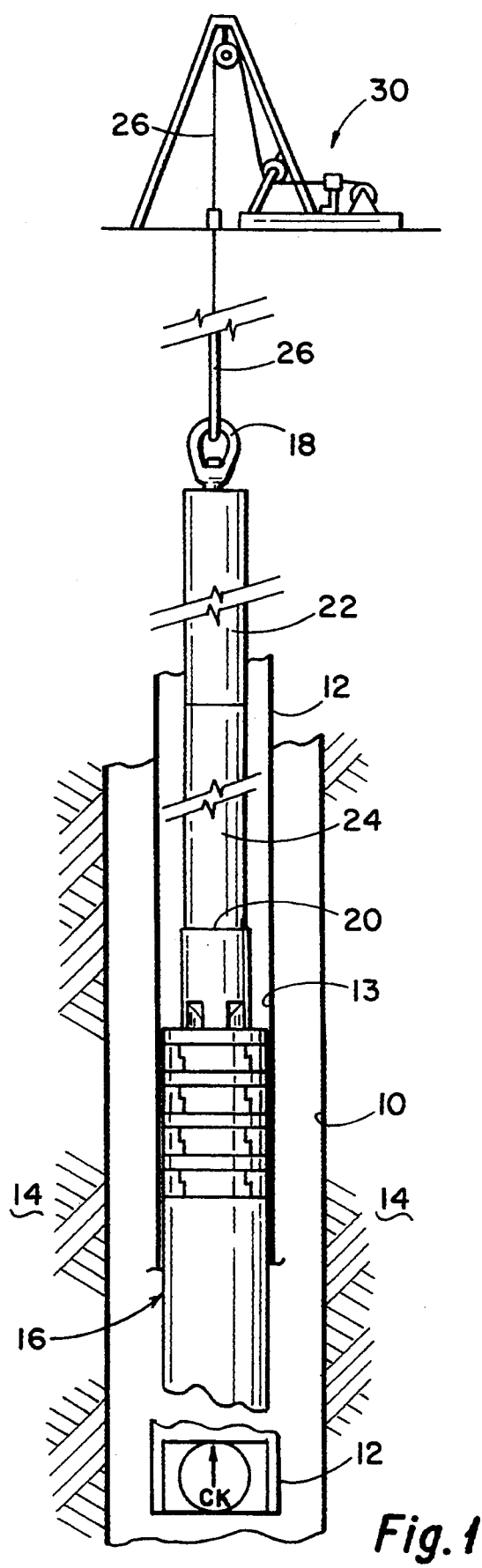
FIG. 1 is an overall elevational view of the apparatus of this invention when utilized in combination with a wire line pumping system.
Figure 5A:
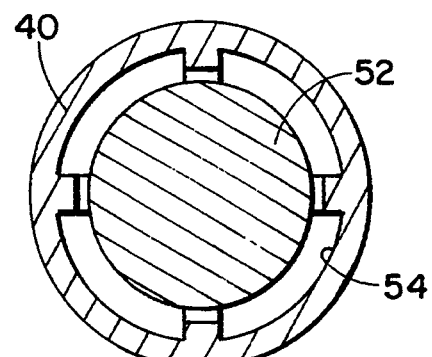
FIG. 5A is a sectional view taken along the line 5A—5A of FIG. 2.

Referring now to FIG. 1, an overall view of a downhole and surface assembly comprises a usually cased well bore 10 within which production tubing 12 has been placed from the surface down to the level where fluids, such as oil and/or water, will enter from subsurface formations 14. In this embodiment the pump plunger of this invention is generally designated by the numeral 16 and comprises means such as swivel 18 or in the event well known sucker rods are used as the form of connector, attachment is made to the top of the plunger 20. In this embodiment additional weights 22 and 24 may be added in view of the use of a wire line 26 form of a surface reciprocating system generally designated by the numeral 30. Typical of such a wire line system is that being marketed and sold by Seal Lift Corporation of Tulsa, Okla. In the event a sucker rod form of connecting means is utilized, the reciprocation occurs through a pivotal horsehead form of mechanism such as diagrammatically shown in FIG. 1 of U.S. Pat. No. 3,953,155.

Figure 2:
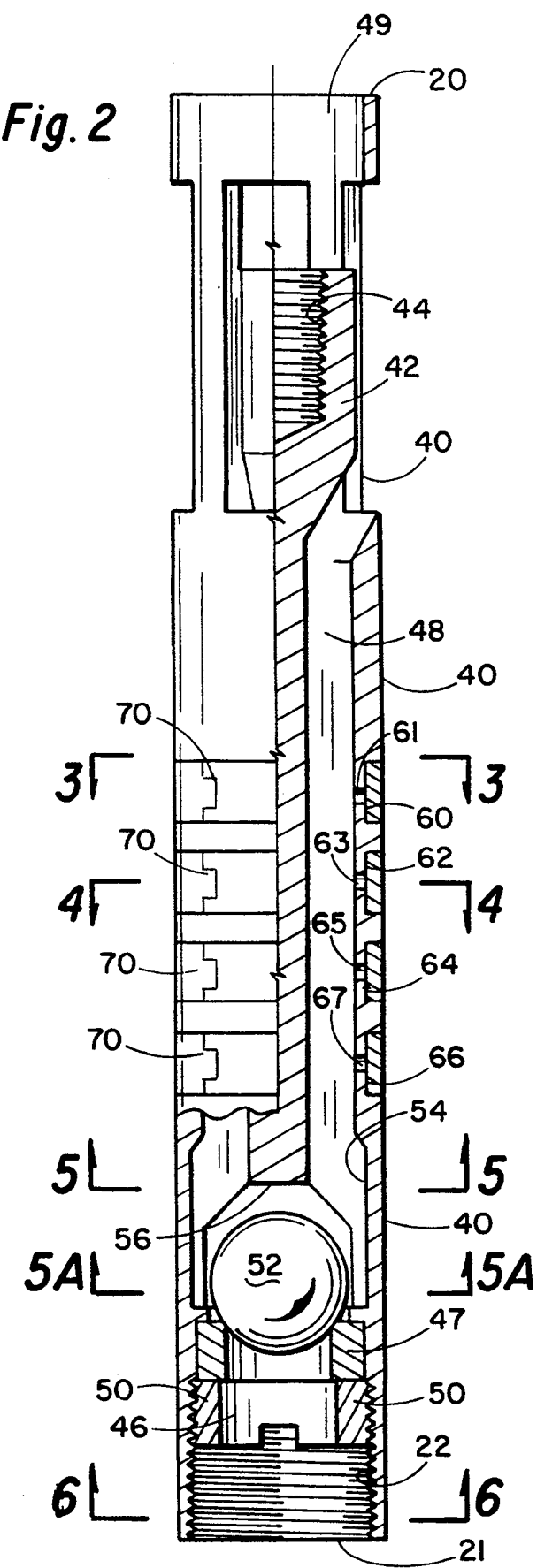
FIG. 2 is a partially cut away view of the plunger of this invention.

Referring now to FIG. 2, the pump plunger of this invention is described in greater detail and comprises a metallic cylinder 40 which may be cast or machined as an integral unit from its top 20 to its bottom 21. Machined or otherwise cast as a part of cylindrical plunger 40 is an upper sleeve portion 42 having means such as threads at 44 for the connection to sucker rod and/or wire line and/or weights 22 and 24 as shown in FIG. 1. The connection, preferably, is positioned below the top of cylinder 40 to provide more guide area and increased stability. An interior fluid flow channel extends from the open bottom 46 upwardly through one or more flow channels 48 to a point just below the sleeve 42 where the flow passes outwardly and upwardly then inwardly via channels 49 and thence into the production tubing 12. At the bottom interior of the plunger is an annular shoulder 47 which may be formed as a part of the cylinder or as a separate valve seat retained by the jam nut 50, all of which are in communication with the interior of the well bore through the open bottom end 21 of the plunger cylinder. A ball closure means 52 is loosely disposed within a cage portion 54 for cooperation with the valve seat 47 to provide alternate open and closed positions for the valve. The ball guide or cage area 54 includes longitudinally extending guides or ribs formed as a part of the inner periphery of the cylindrical plunger 40. The outside wall of the plunger 40 around the ball guide or cage area 54 is thinner at this point to allow fluid to pass more freely around the ball 52. Guide ribs around the ball 52 in the cage area 54 are an integral part of the plunger body 40 to add back strength that was lost when the walls around cage area 54 were thinned to allow increased fluid flow. The top of the cage assembly 54 includes means 56 to stop the upward movement of the ball 52 and is of a substantially concave spherical configuration that will be complimentary to the configuration of the outer periphery of the ball 52. The longitudinal guides or ribs formed as a part of the cage 54 will guide the longitudinal movement of the ball within the cage during the opening and closing of the valve. The arrangement of the valve seat 47, the cage 54 and the upper spherical configuration all operate to reduce transverse movement or "bouncing around" of the ball valve 52 in its open position and thus greatly reduce wear and/or damage to the ball and/or the cage area 54.

A plurality of seal ring grooves 60, 62, 64 and 66 are machined or formed as a part of the cylindrical plunger 40 and include a plurality of respective openings 61, 63, 65 and 67 respectively which openings communicate fluid with the interior flow channel 48 and the backside of the seal ring assemblies 70.

Figure 4:
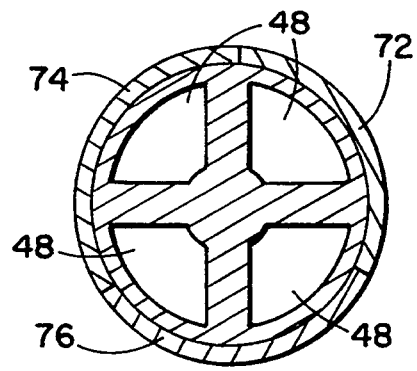
FIG. 4 is a sectional view taken along the line of 4—4 of FIG. 2.
Figure 5:
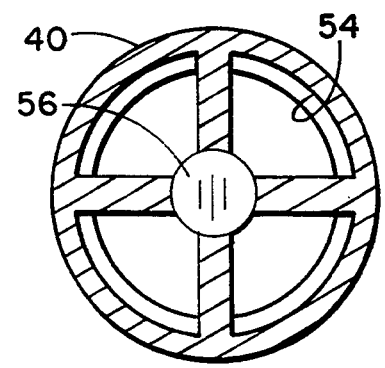
FIG. 5 is a sectional view taken along the line 5—5 of FIG. 2.
Figure 6:
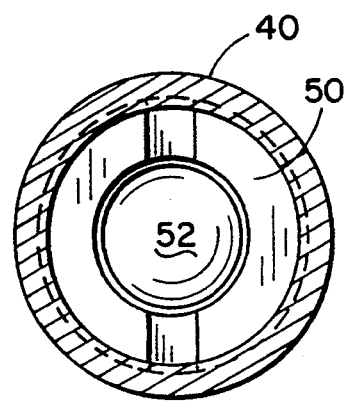
FIG. 6 is a sectional view taken along the line 6—6 of FIG. 2.
Figure 3:
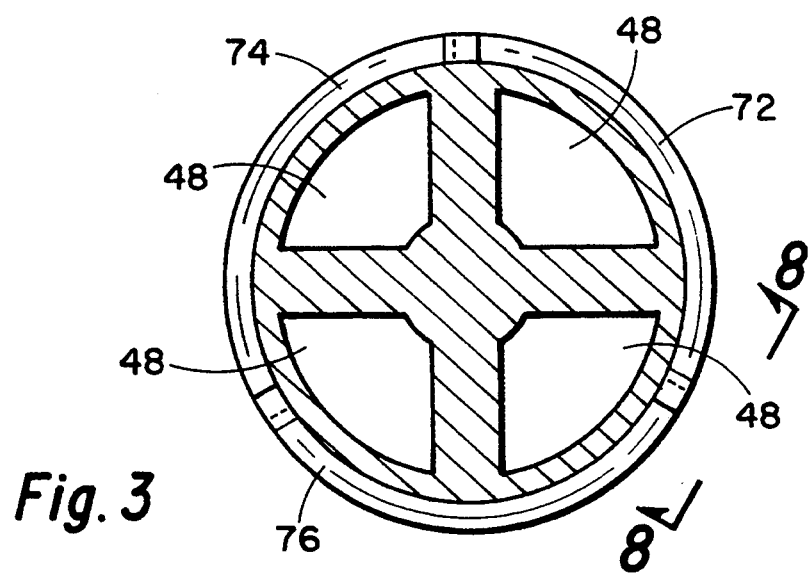
FIG. 3 is a sectional view taken along the line of 3—3 of FIG. 2.
Figure 8:
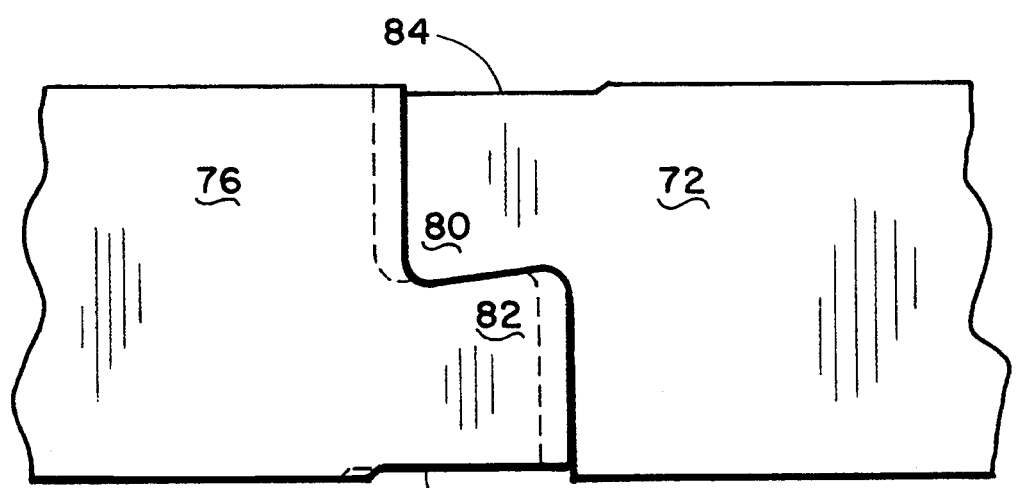
FIG. 8 is a partial side view of a one form of seal ring used with the plunger of this invention as taken along the line 8—8 of FIG. 3.
Figure 9:
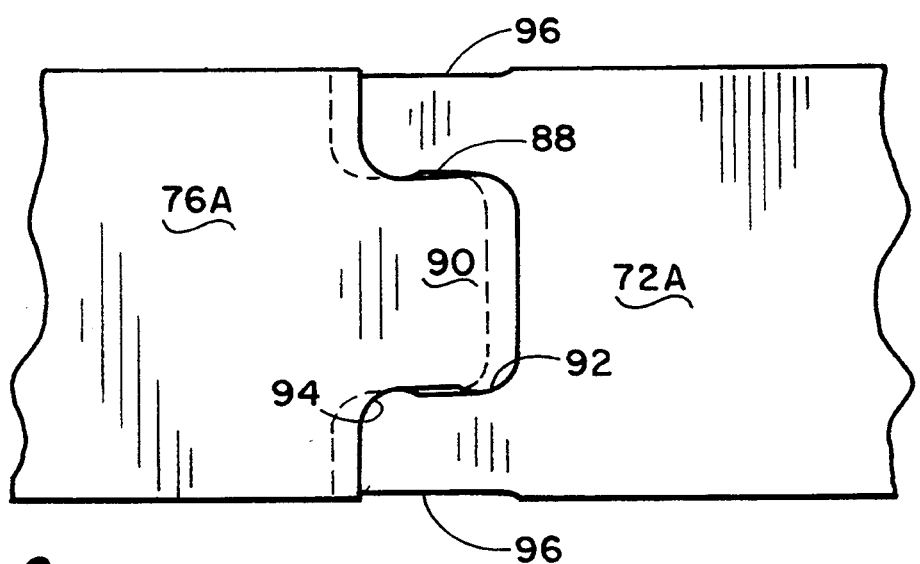
FIG. 9 is a partial side view of another form of a seal ring as would be viewed similarly as in FIG. 8.

As shown in FIGS. 3 and 4, the seal rings are comprised of a plurality, e.g., three metallic arcuate segments 72, 74 and 76. Each of the segments are interlocked together so as to be nested together when retracted as shown in FIGS. 8 and 9. As shown in FIG. 8, lobe 80 formed at one end of segment 72 interlocks with lobe 82 formed at the other end but in this view as the interlocking lobe of arcuate ring 76. A relief section 84 in the outer edge of segment 72 and 86 in the outer edge of segment 76 are provided opposite each lobe for the purposes of preventing interference with the top and bottom sides of the groove when the segments are expanded.

A preferred embodiment of interlocking means is shown in FIG. 9 wherein segment 72A includes female dove tail like opening 88 formed at one end of ring 72A which is adapted to receive the male portion 90 formed at the other end, but in this view as a part of ring 76A. In other words, each ring segment includes a male portion at one end and a female opening at the other. The segments are interlocked at each end by reason of the projecting portion 92 relative to the projection lobe 94 formed as a part of the female opening in segment 72A. Relief portions 96, in this embodiment, are formed at the female end of segment 72A. Each seal ring, because of the interlocking arrangement is capable of expanding because of the fluid pressure during the lifting stroke operating through openings 61 against the backside of the rings 72, 74 and 76. This is shown somewhat by the dotted lines in FIGS. 8 and 9. Yet, during the downstroke, The segments will essentially retract to the position shown in FIGS. 8 and 9.

Figure 7:
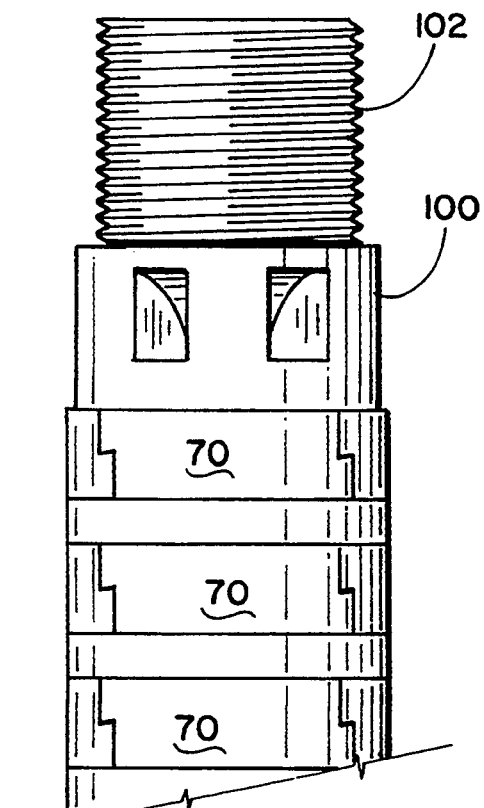
FIG. 7 is a partial elevation view of an additional plunger of this invention capable of attachment to the plunger of FIG. 1.

The embodiment shown in FIG. 7 is an additional follower pump plunger having a cylindrical body 100 and in most respects substantially identical to the plunger 16 except at the top are threads 102 which are adapted to be threadably interconnected with the cylindrical sleeve 40 and bottom threads 22. From thereon, the assembly is substantially identical as taught herein.

In operation, an unbalance in fluid pressure between the interior of cylindrical pump plunger 16 and the suction side of the pump will cause the seal rings 70 to be expanded in an outward direction and thus providing a seal with respect to the working barrel 13 formed as a part of the production tubing 12. For instance, in lifting fluid to the surface of the earth with the plunger 16, the increased hydrostatic fluid pressure affected on the upstroke within the plunger which pressure operating via the production tubing into flow channels 49 and 48 through openings 61, 63, 65 and 67 against the back side of the seal rings 70 will force them outwardly to engage the inside peripheral wall of the working barrel 13 with a force which is proportional to the pressure within the production tubing and thereby increase the sealing action accordingly. During the downward stroke, the lower end of the plunger moves downwardly through the well fluid which causes the valve ball 52 to move upwardly and away from its seat 47. The well fluid then flows through the open valve for delivery into the passageways 48 for discharge from the upper end of the plunger into the production tubing and thence onward to the surface. Of course, on the upstroke, the ball valve 52 is then returned into engagement with the valve seat 47. Continued reciprocation of the pump assembly results in elevating or lifting the well fluid to the surface of the ground for recovery.

It will be apparent because of the nature of the metallic seal rings used in this invention that not only will there be an efficient sealing action with the working barrel periphery 13 but there will also be adequate lubrication between the sealing rings and the working barrel during the pump operation.

What is claimed is:

1. In a downhole submerged pump assembly having a plunger reciprocatingly received in sealed relationship within a working barrel formed as a part of production tubing, a reciprocatable connecting rod or wire line affixed to the plunger, and means including a valve arranged to force production fluid upward through the production tubing as the reciprocatable rod or wire line reciprocates the plunger, said plunger comprised of a metallic cylinder, a connection means for attaching said connecting rod or wire line to said plunger, said connection positioned below the top of said cylinder, said cylinder providing an interior flow channel for said fluid that extends from an open threaded bottom upwardly and thence outwardly into said production tubing, a bottom interior of said cylinder containing a ball and lower seat retained by a threaded sleeve, a plurality of seal ring grooves in said cylinder, a plurality of openings in each groove which communicate with said interior flow channel, the improvement comprising:

a seal ring assembly for each said groove, each assembly comprised of a plurality of semi-cylindrical flat ring segments each of said segments having ends which interlock circumferentially and are radially expandable with the next adjacent segment.

2. The assembly of claim 1 wherein said connection means includes an exterior flow channel that communicates with said interior flow channel.

3. The assembly of claim 1 wherein said ring segments are metal.

4. The assembly of claim 3 wherein said ring segments are three in number.

5. The assembly of claim 4, wherein the ends of said segments comprise mating lobed surfaces.

6. The assembly of claim 5 including a relief groove formed along an outer edge at one end of each said ring segment.

7. The assembly of claim 4 wherein the interlock for each segment comprises a female end and a male end.

8. The assembly of claim 7 wherein relief grooves are formed along an outer edge of said ring segment outward of a female opening.

9. A fluid pump plunger comprising:
a metallic cylinder having a top and a bottom,
means below said top to attach means to reciprocate said plunger,
an interior flow channel for said fluid that extends from said bottom to said top of said cylinder,
a bottom interior being threaded;
a ball and valve seat threadably retained above the bottom of said cylinder;
a plurality of seal ring grooves in said cylinder;
a plurality of openings in each groove which communicate with said interior flow channel, and
a seal ring assembly for each said groove, each assembly comprised of a plurality of arcuate flat ring segments each of said segments having ends which interlock circumferentially and are radially expandable with the next adjacent segment.

10. A plunger of claim 9 wherein said ring segments are metal.

11. A plunger of claim 10 wherein said ring segments are three in number.

12. A plunger of claim 11 wherein the ring segments having ends which comprise mating lobed surfaces.

13. A plunger of claim 12 including a relief groove formed along an outer edge at one end of each said ring segment.

14. A plunger of claim 11 wherein the interlock for each segment comprises a female end and a male end.

15. A plunger of claim 14 wherein relief grooves are formed along an outer edge of said ring segment outward of a female opening.

* * * * *